(12) United States Patent
Aiyama et al.

(10) Patent No.: US 7,173,346 B2
(45) Date of Patent: Feb. 6, 2007

(54) DOOR HANDLE DEVICE FOR VEHICLE AND DOOR OPENING AND CLOSING SYSTEM FOR VEHICLE APPLIED THEREWITH

(75) Inventors: Takaya Aiyama, Toyota (JP); Kazuyoshi Mori, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 732 days.

(21) Appl. No.: 10/367,780

(22) Filed: Feb. 19, 2003

(65) Prior Publication Data

US 2003/0184098 A1    Oct. 2, 2003

(30) Foreign Application Priority Data

Feb. 19, 2002  (JP)  .............. 2002-042125

(51) Int. Cl.
*B60L 1/00*    (2006.01)
*B60L 3/00*    (2006.01)
*H02G 3/00*   (2006.01)

(52) U.S. Cl. ...................... 307/9.1; 307/10.1
(58) Field of Classification Search ................. 307/9.1; 292/336.3
See application file for complete search history.

(56) References Cited

U.S. PATENT DOCUMENTS 5,769,471 A    6/1998  Suzuki et al.
6,241,294 B1 *  6/2001  Young et al. ............ 292/336.3
6,809,630 B1   10/2004  Dreimann et al.
2001/0035656 A1  11/2001  Stuart et al.
2002/0148075 A1 * 10/2002  Monig ........................ 16/412

FOREIGN PATENT DOCUMENTS

| DE | 198 25 708 A1 | 3/1999 |
|---|---|---|
| EP | 1 083 285 A1 | 8/2000 |
| JP | 54-57720 A | 5/1979 |
| JP | 63-3772 B2 | 1/1988 |
| JP | 63-5167 U | 1/1988 |
| JP | 6-146688 A | 5/1994 |
| JP | 9-118196 A | 5/1997 |

* cited by examiner

Primary Examiner—Stephen W. Jackson
Assistant Examiner—Carlos Amaya
(74) Attorney, Agent, or Firm—Buchanan Ingersoll & Rooney PC

(57) ABSTRACT

A vehicle door handle device which includes a handle body assembled to a panel of a vehicle door, an operation member provided in the handle body for operating a latch mechanism for switching a latched state and an unlatched state relative to a vehicle body of the vehicle door, and a detection member provided in the handle body for detecting an impact.

20 Claims, 5 Drawing Sheets

DOOR HANDLE DEVICE FOR VEHICLE AND DOOR OPENING AND CLOSING SYSTEM FOR VEHICLE APPLIED THEREWITH

This application is based on and claims priority under 35 U.S.C. § 119 with respect to Japanese Patent Application No. 2002-042125 filed on Feb. 19, 2002, the entire content of which is incorporated herein by reference.

FIELD OF THE INVENTION

The present invention relates to a door opening and closing system. More particularly, the present invention pertains to a door handle device for a vehicle and a door opening and closing system for vehicle applied with the door handle device.

BACKGROUND OF THE INVENTION

A known door opening and closing system for vehicle is disclosed in Japanese Patent Laid-Open Publication No. H06-146688. The known door opening and closing system for vehicle disclosed in Japanese Patent Laid-Open Publication No. H06-146688 includes a latch mechanism for switching an openable state and a closed state relative to a vehicle body of a vehicle door (i.e., an unlatched condition and a latched condition relative to a vehicle body of a vehicle door), an actuator for operating the latch mechanism, a handle body provided at a panel member of the vehicle door, a switch provided at the handle body for operating the latch mechanism through the actuator, a lock-unlock switch for switching a state enable to operate the latch mechanism and a state unable to operate the latch mechanism (i.e., an unlocked state and a locked state) using the switch, a G sensor for detecting an inertia force loaded on the vehicle, and a control circuit for controlling an driving of the actuator based on a detected signal of at least one of the switch, the G sensor, and the lock-unlock switch.

With the known door opening and closing system for vehicle disclosed in Japanese Patent Laid-Open Publication No. H06-146688, the actuator, thus the latch mechanism is operated by an input signal of the switch for switching the unlatched state and the latched state of the vehicle door. The locked state and the unlocked state are switched by an input signal of the lock-unlock switch (i.e., the normal state). In case the vehicle door is under the locked state and the G sensor detects the inertia force to the vehicle due to the collision such as car clash, a control means switches the vehicle door to be the unlocked state irrespective of the operation of the lock-unlock switch. Then, the unlocked state is maintained (i.e., emergency state). The known door opening and closing system enables to open the vehicle door both from inside and outside of the vehicle at the vehicle collision and enables the evacuation of the operator and the passengers from the vehicle. That is, the door opening and closing system for the vehicle includes a function to switch the open and closed conditions of the vehicle door between under the normal state and the emergency state by the detection of the inertia force by the G sensor provided in the vehicle.

Notwithstanding, with the door opening and closing system for the vehicle disclosed in Japanese Patent Laid-Open Publication No. H06-146688, there may be drawbacks as follows. That is, the door open and closed conditions of the vehicle door may not be switched in case the inertia force loaded to the vehicle as a whole is less than a predetermined value when the object is directly collided with the vehicle door from the side and when only a portion adjacent the vehicle door portion contacts the object. Because the impact to the vehicle door influences the opening and closing function of the vehicle door, it is desirable that the door open and closed conditions for the vehicle are switched even by the impact only to the vehicle door. In this case, the detection sensitivity of the inertia force loaded to the vehicle as a whole (i.e. the detection sensitivity of the G sensor) may be increased for obviating the drawback. However, in that case, the door open and closed condition of the vehicle is frequently and unnecessarily switched, which gives the unpleasant feeling to the occupants.

A need thus exists for a door opening and closing system for a vehicle and a door handle device which securely performs the switching of an open and closed conditions of the vehicle door when receiving the impact at the vehicle door.

SUMMARY OF THE INVENTION

In light of the foregoing, the present invention provides a vehicle door handle device which includes a handle body assembled to a panel of a vehicle door, an operation member provided in the handle body for operating a latch mechanism for switching a latched state and an unlatched state relative to a vehicle body of the vehicle door, and a detection member provided in the handle body for detecting an impact.

According to another aspect of the present invention, the present invention provides a vehicle door opening and closing system which includes a latch mechanism provided on a vehicle door for switching a latched state and an unlatched state relative to a vehicle body of the vehicle door, an actuator for operating the latch mechanism, a handle body assembled to a panel of the vehicle door, an operation member provided on the handle body for operating the latch mechanism through the actuator, a detection member provided on the handle body for detecting an impact to the handle body, and a control means for controlling a driving of the actuator based on an operation of the operation member and a detected result of the detection member.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
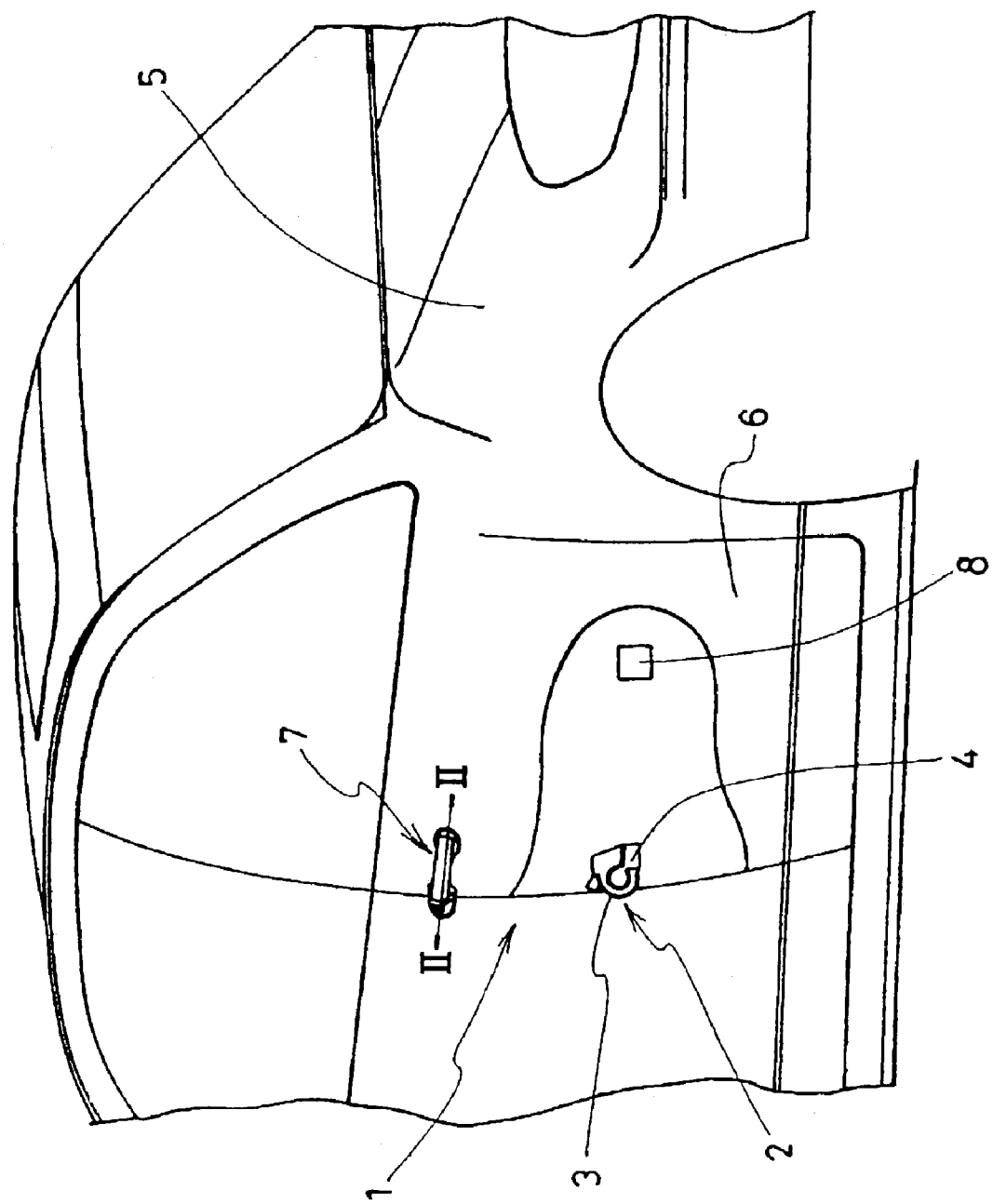
FIG. 1 is an overview showing a door handle device for a vehicle provided on a vehicle door according to embodiments of the present invention.

Embodiments of a vehicle door opening and closing system will be explained with reference to drawing figures. As shown in FIG. 1, a door 1 (i.e., serving as a vehicle door) includes a door lock device 2. The door lock device 2 includes a latch mechanism 3 (i.e., serving as a latch mechanism), an actuator 4 (i.e., serving as an actuator). The latch mechanism 3 is selectively engaged with a striker (not shown) of a vehicle body (i.e., serving as a vehicle body) by the selective engagement between a latch (not shown) and a pawl (not shown). Thus, the latch mechanism 3 switches a latched state for maintaining the vehicle door 1 at a closed state relative to the vehicle body 5 and an unlatched state during which the vehicle door 1 is openable relative to the vehicle body 5. The actuator 4 operates the latch mechanism 3, thus the door 1 is switched from the latched state to the unlatched state by the actuator 4. A door outer panel (i.e., hereinafter referred as a door panel) 6 of the vehicle door 1 is assembled with a door outside handle device (i.e., hereinafter referred as a handle device) 7.

The door 1 includes a door lock control circuit (i.e., serving as a control means) 8. The control circuit 8 is connected to the handle device 7 via wires 25 and to the door lock device 2 via wires (not shown). The control circuit 8 controls the driving of the actuator 4 based on an electric signal from the handle device 7.

Figure 2:
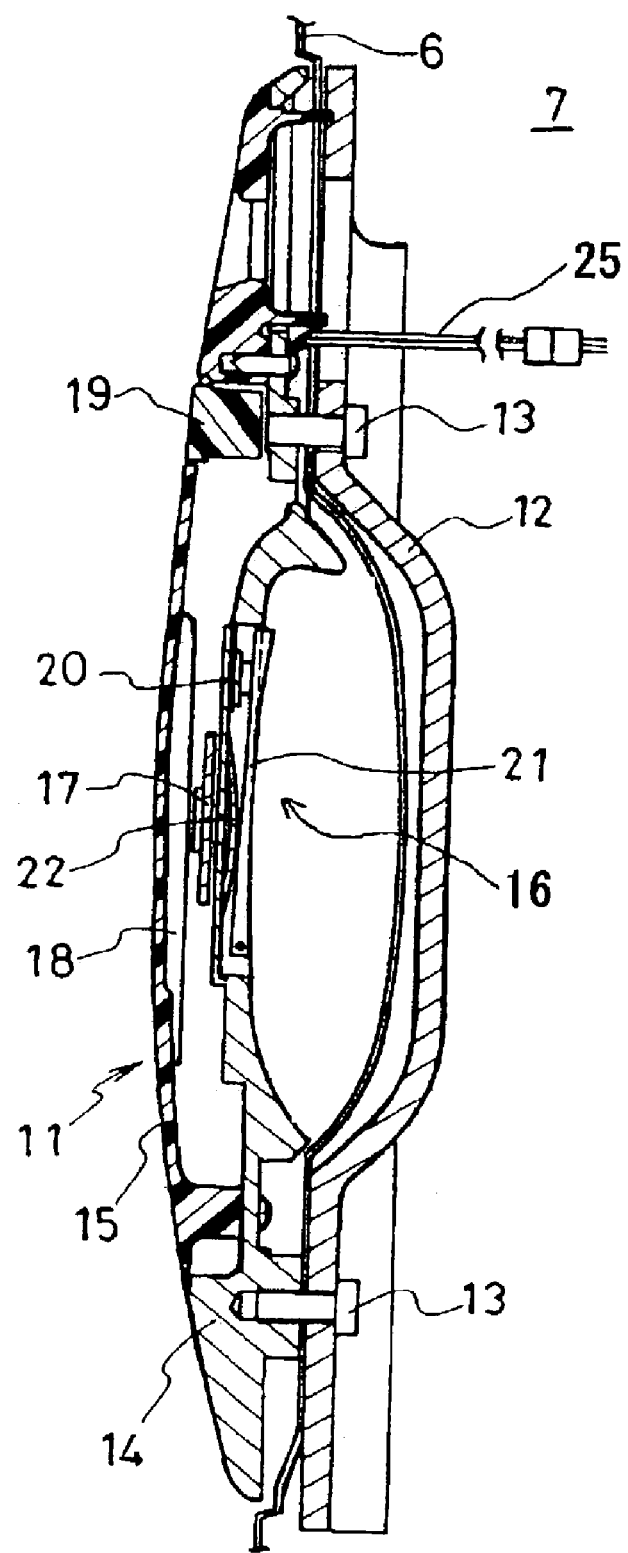
FIG. 2 is a cross-sectional view of the door handle device for the vehicle taken on line II—II of FIG. 1 according to the embodiments of the present invention.
Figure 3:
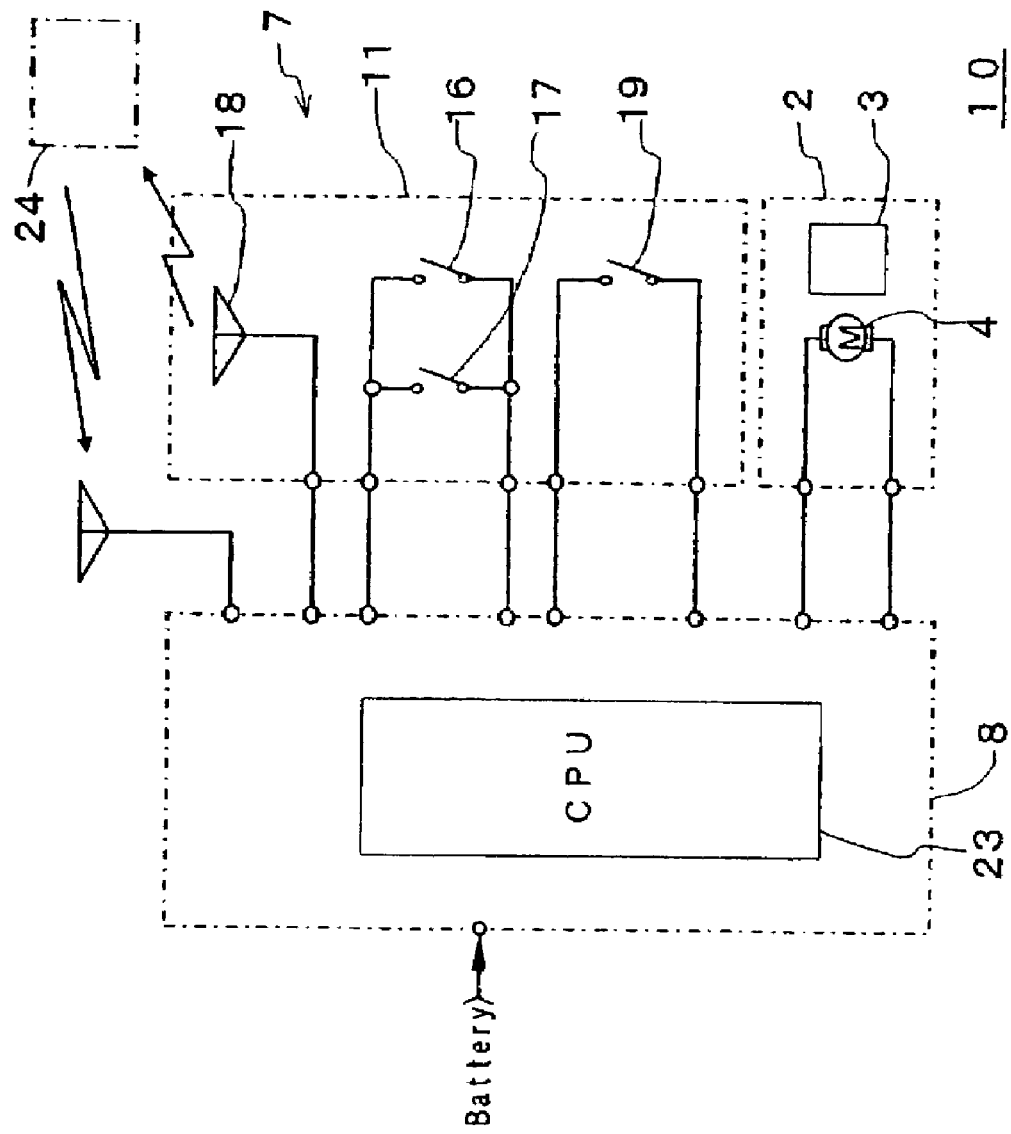
FIG. 3 is a view showing a vehicle door opening and closing system according to embodiments of the present invention.

Referring to FIGS. 2–3, the construction of the handle device 7 and a door opening and closing system 10 for a vehicle (i.e., serving as a vehicle door opening and closing system) including the handle device 7 will be explained as follows. As shown in FIG. 2, the handle device 7 includes a grip 11 (i.e., serving as a handle body). The grip 11 is positioned keeping a predetermined clearance with the panel 6. The grip 11 is fixed to a frame 12 provided inside of the panel 6 by both end portions in the longitudinal direction via fixing bolts 13. The grip 11 is positioned so that the longitudinal direction of the grip 11 being along the longitudinal direction of the vehicle (i.e., top-bottom direction of FIG. 2). A portion of the panel 6 corresponding to the grip 11 is curved to have a concave towards the door 1 (i.e., right side of FIG. 2) to ensure a space for inserting fingers between the grip 11 and the panel 6.

The grip 11 includes a base 14 formed by zinc die casing and a cover 15 fixed to the base 14. A recess portion is formed on the base 14 on a side opposing to the door 1 and a latch switch 16 (i.e., serving as an operation member) is provided in the recess portion. Another recess portion is formed on the base 14 on a side opposing to the cover 15 to accommodate a G sensor 15 (i.e., serving as a detection member) and an antenna 18 between the base 14 and the cover 15. A lock switch 19 is provided at approximately end of the cover 15 (i.e., top end of FIG. 2).

The latch switch 16 includes a membrane switch 20, a trigger 21, and a leaf spring 22. One end (i.e., bottom end of FIG. 2) of the trigger 21 is fixed to the base 14 to be swingable about the fixed end relative to the base 14. When slightly moving the trigger 21 towards the internal direction of the grip 11 against a biasing force of the leaf spring 22 (i.e., left direction of FIG. 2), the membrane switch 20 is pressed to be an ON state. On the other hand, when the trigger 21 is returned towards the door 1 (i.e., right side direction of FIG. 2) by the biasing force of the leaf spring 22, the membrane switch 20 becomes OFF. The membrane switch 20 is connected to the control circuit 8. The control circuit 8 transmits a drive signal to the actuator when recognizing an input of an ON signal from the membrane switch 20. Thus, the door 1 is switched from the latched state to the unlatched state. A state in which the actuator 4 is driven by the ON signal from the membrane switch 20 corresponds to an unlocked state of the door lock device 2. On the other hand, a state in which the driving of the actuator 4 is prohibited even if the ON signal of the membrane switch 20 is transmitted corresponds to a locked state. The determination of the unlocked state and the locked state is performed by the control circuit 8 by memorizing each state in a memory of a CPU 23.

Switching of the unlocked state and the locked state by the antenna 18 and the lock switch 19 will be explained as follows. As shown in FIG. 2, the antenna 18 is fixed to the cover 15. As shown in FIG. 3, the antenna 18 is connected to the control circuit 8. The control circuit 8 transmits a calling signal to a remote controller 24 carried by a vehicle user. The remote controller 24 transmits an ID signal corresponding to the calling signal. The control circuit 8 receives the ID signal and check the signal. When the ID signal is identified, the control circuit 8 determines the locked state of the door lock device 2 to be the unlocked state. On the other hand, the lock switch 19 is connected to the control circuit 8 via the wires 25. When the lock switch 19 is pressed towards the door 1 (i.e., right direction of FIG. 2), an ON signal is transmitted to the control circuit 8. The control circuit 8 transmits the calling signal to the remote controller 24 from the antenna 18 corresponding to the ON signal from the lock switch 19. When the control circuit 8 receives the ID signal from the remote controller 24, check the ID signal, and the ID signal is identified, the control circuit 8 determines to switch the unlocked state of the door lock device 2 to be the locked state.

The G sensor 17 is fixed to the base 14. As shown in FIG. 3, the G sensor 17 is connected to the control circuit 8 in parallel with the latch switch 16. A connection construction of the latch switch 16 and the G sensor 17 is completed as one unit in the handle device 7. Thus, it is easy to assemble the handle device 7 to the door 1. The details of the connecting method will be explained hereinafter. The G sensor 17 detects the acceleration due to the impact around the handle device 7 by a principle of semiconductor capacitance type. The G sensor 17 includes a movable electrode (not shown) and a fixed electrode (not shown) for detecting a variation of the capacitance between the movable electrode and the fixed electrode. The condition of the G sensor 17 is to detect the impact around the handle device 7. Thus, other detection principles such as a semiconductor strain gauge type, pendulum type, and deformative fuse type may be applied. The semiconductor strain gauze type detects the impact by detecting a variation of a strain stress applied to the base 14 by the impact. As a variation of applying the semiconductor strain gauze type, a strain sensor (not shown) may be provided on the frame 12 in the door 1 for detecting a variation of the strain of the frame 12 by the stress by the impact. Because the frame 12 is connected to two fixed bolts 13, by providing the sensor on the frame between the fixing bolts 13, the strain between the fixed bolts 13, 13 where is susceptible to generating the strain can be detected with high sensitivity. The pendulum type sensor includes a weight (not shown) which swings by the inertia force and a contact terminal (not shown). The impact is detected by detecting the weight swung due to the impact to the handle device 7 to contact the contact terminal. The deformative fuse type detects the impact by detecting that a fuse portion (not shown) is cut by the impact to the handle device 7 and the deformation of the fuse.

Figure 4:
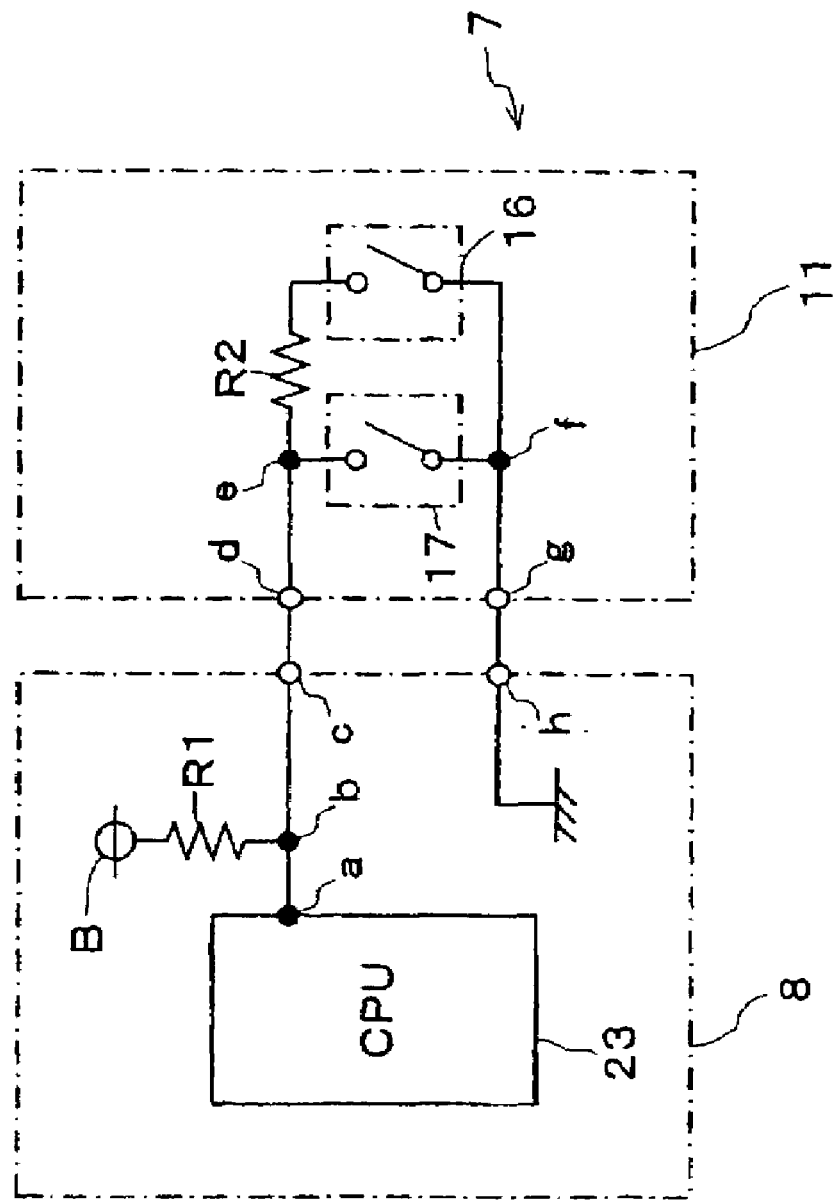
FIG. 4 is a view showing a connection between a control circuit, a G sensor, and a latch switch with the door opening and closing system according to a first embodiment of the present invention.

The connection between the latch switch 16, the G sensor 17, and the control circuit 18 will be explained based on FIG. 4. A power source B is connected to a terminal b in the control circuit 8 via a resistance R1. A terminal h side in the control circuit 8 is connected to a ground. The G sensor 17 and the latch switch 16 which is connected in series with a resistance R2 are connected in parallel each other between a terminal e and a terminal f in the handle device 7. The resistance value of the resistance R1 and the resistance R2 is determined to be the equal.

The operation of the vehicle door opening and closing system 10 will be explained. Particularly, the switching between the normal state and the emergency state of the door open and closed condition of the vehicle door opening and closing system 10 when the collision is caused will be explained. The switching between the normal state and the emergency state is performed by memorizing each state in the internal memory by the CPU 23.

As shown in Table 1, the CPU 23 switches the normal state and the emergency state in accordance with an electric voltage level affecting a terminal a.

TABLE 1

| G sensor 17 | ON (detecting collision/emergency) | | OFF (not detecting collision/normal) | |
| --- | --- | --- | --- | --- |
| Latch switch 16 | ON (activated) | OFF (Not operated) | ON (activated) | OFF (Not operated) |
| CPU 23 electric voltage level | Lo | Lo | Mid | Hi |

The normal state in which the G sensor 17 is OFF will be explained. Under this state, the electric voltage level becomes high level (i.e., referred as Hi) when the latch switch 16 is OFF. When the latch switch 16 is ON, the electric voltage level becomes middle level (i.e., referred as Mid). Under the normal state, the control circuit 8 including the CPU 23 drives the actuator 4 when the electric voltage level becomes the middle level (i.e., latch switch 16 is ON). Next, the emergency state under witch the impact is applied to the handle device 7 to turn the G sensor 17 ON will be explained. Under the emergency state, the electric voltage level becomes low level (i.e., referred as Lo). When the electric voltage level is Lo, the control circuit 8 including the CPU 23 prohibits the driving of the actuator 4. As shown in FIG. 4 and Table 1, the electric voltage level remains Lo under the emergency state irrespective of ON/OFF state of the latch switching 16. As shown above, when the electric voltage level corresponds to Hi or Mid level, the CPU 23 determines the normal state and when the electric voltage level corresponds to the Lo, the CPU 23 determines the emergency state. With this connecting construction, the electric voltage level becomes Lo even when the connection between the terminals c and d becomes the ground connection due to the collision of the vehicle to determine the emergency.

With the vehicle door opening and closing system 10, because the G sensor 17 for detecting the impact is provided in the handle device 7, the impact to the handle device 7 can be securely detected. Because the control circuit 8 prohibits the driving of the actuator 4 by the latch switch 16 by the detection of the impact, undesired opening of the door 1 at the collision can be prevented. Thus, it is unlikely that the occupants are hurled out of the vehicle at the collision.

The CPU 23 observes the elapse of time since the electric voltage level becomes Lo (i.e., under emergency state) with an internal timer (not shown). After elapsing a predetermined time, the CPU 23 releases the prohibition of the driving of the actuator 4. Thus, the occupants can be smoothly evacuated from the vehicle after elapsing the predetermined time after the collision.

Figure 5:
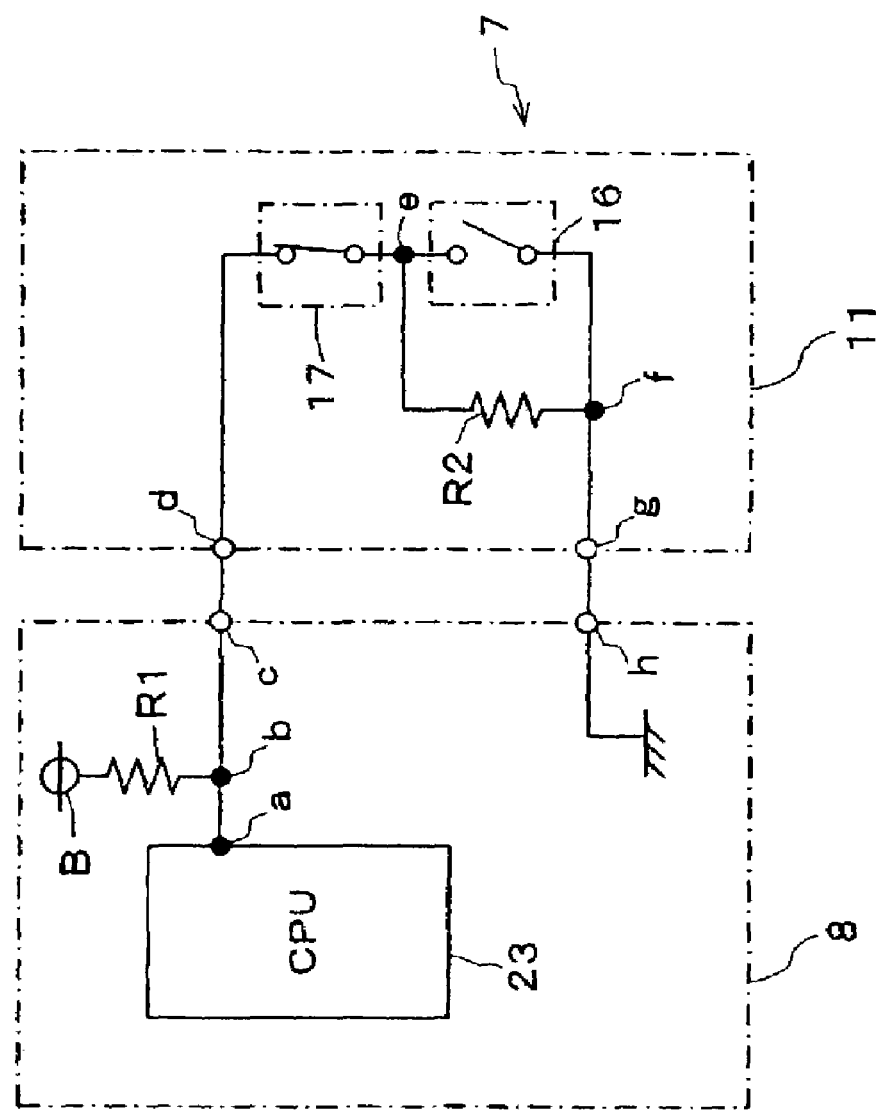
FIG. 5 is a view showing a connection between a control circuit, a G sensor, and a latch switch with the door opening and closing system according to a second embodiment of the present invention.

A second embodiment of the vehicle door opening and closing system and the door handle device for the vehicle will be explained with reference to FIG. 5. The construction of the vehicle door opening and closing system according to the second embodiment is the same with the first embodiment except the connecting method between the latch switch 16 and the G sensor 17. Thus, the explanation is not repeated. As shown in FIG. 5, the latch switch 16 and the G sensor 17 which is connected in parallel with the resistance R2 between the terminal e and the terminal f are connected in series. The G sensor 17 of the second embodiment has a construction to be energized under the normal state (i.e., OFF state; the state that the impact is applied to the G sensor) and to be non-energized under the emergency state (i.e., ON state). For example, deformative fuse type sensor is applied as the G sensor 17 of the second embodiment.

The operation of the vehicle door opening and closing system will be explained as follows. Particularly, the switching between the normal state and the emergency state regarding the door open and closed condition of the vehicle door opening and closing system 10 is explained.

As shown in Table 2, the CPU 23 has a construction to switch the normal state and the emergency state in accordance with the electric voltage level affecting the terminal a.

TABLE 2

| G sensor 17 | ON (detecting collision/emergency) | | OFF (not detecting collision/normal) | |
| --- | --- | --- | --- | --- |
| Latch switch 16 | ON (activated) | OFF (Not operated) | ON (activated) | OFF (Not operated) |
| CPU 23 electric voltage level | Hi | HI | Lo | Mid |

The normal state under which the G sensor 17 is OFF will be explained. Under the normal state, when the latch switch 16 is OFF (i.e., the latch switch 16 is not operated), the electric voltage level is determined to be the middle level (i.e., referred as Mid). When the latch switch 16 is ON, the electric voltage level is determined to be the low level (i.e., referred as Lo). Under the normal state, the control circuit 8 including the CPU 23 drives the actuator 4 when the electric voltage level becomes Lo (i.e., latch switch 16 is ON). Next, the emergency state under which the impact is applied to the handle device 7 to turn the G sensor 17 ON is explained. Under the emergency state, the electric voltage level becomes high (i.e., referred as Hi). When the electric voltage level becomes Hi, the control circuit 8 including the CPU 23 prohibits the driving of the actuator 4. As shown in FIG. 5 and Table 2, the electric voltage level is determined to be Hi under the emergency state irrespective of the ON/OFF condition of the latch switch 16. As examined above, the CPU 23 determines the normal state when the electric voltage level is Lo or Mid level. When the electric voltage level is Hi level, the CPU 23 determines the emergency state. With this construction, even when the wire between, for example, the terminal c and the terminal d is cut, the electric voltage affecting the terminal a becomes Hi, thus the emergency state can be determined.

Likewise the first embodiment, the prohibition of the driving of the actuator 4 of the vehicle door opening and closing system of the second embodiment is released after the predetermined elapsing of time after the determination of the emergency state using the internal timer of the CPU 23.

Although the switching between the latched state and the unlatched state and between the locked state and the unlocked state of the first and the second embodiments is performed with an electric type that the control circuit 8 controls the actuator 4, the switching may be performed using mechanical mechanism (i.e., door lock mechanism; not shown). In this case, the control circuit 8 may control a door lock actuator (not shown) for switching the locked state and the unlocked state of the door lock mechanism by the operation of the lock switch 19 under the normal state and the door lock actuator may be controlled under the emergency state in accordance with the detected result when the G sensor 17 detects the impact.

According to the embodiments of the present invention, the detection member for detecting the impact is provided on the handle body. Thus, the impact can be securely detected even if the impact is loaded to the handle body or only to the vehicle door around the handle body. The switching performance of the door open and closed conditions can be securely performed by controlling the actuator for operating the latch mechanism by the control means using the detected impact for switching the vehicle door open and closed condition. By applying the detected impact by the detection member to the switching of the vehicle door open and closed condition, the switching can be performed securely.

According to the embodiments of the present invention, the circuit of the detection member and the operation member is formed to be accommodated in the handle body. With this construction, the operation member and the detection member are provided in the handle body and further connected via the circuit in the handle body. That is, two members and the circuit are accommodated as one unit in the handle body. With this construction, it is easy to assemble the vehicle door handle device to the vehicle.

According to the embodiment of the present invention, under the normal state, the control means drive the actuator by operating the operation member. With the operation of the control means, the latch mechanism is operated to switch the vehicle door from the closed state (i.e., latched state) to the openable state (i.e., unlatched state). The control means prohibits the driving of the actuator when receiving the impact from such as the vehicle collision (i.e., emergency state). Thus, the control means does not operate the latch mechanism even if the unexpected operation of the operation member is caused at the collision. Thus, the possibility that the occupants are hurled out of the vehicle at the collisions by the undesired opening of the door can be prevented.

According to the embodiment of the present invention, the control means prohibits the driving of the actuator when the detection member detects the impact and the control means releases the driving prohibition of the actuator when the predetermined time has elapsed after detecting the impact. Thus, the vehicle door becomes openable after elapsing the predetermined time after receiving the impact to the handle body or the around vehicle door. This enables the occupants to evacuate from the vehicle and others to rescuer the occupants.

According to the embodiment of the present invention, the detection member for detecting the impact to the handle body is provided in the handle body. Thus, the detection member securely detects the impact loaded only to the handle body, or the vehicle door. And the control means controls the driving of the actuator based on the detection signal of the detection member. Thus, the switching of the vehicle door open and closed condition can be securely performed when receiving the impact to the vehicle door.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door handle device comprising:
   a grip assembled to a panel of a vehicle door;
   an operation member provided in the grip for operating a latch mechanism through driving of an actuator for switching a latched state and an unlatched state relative to a vehicle body of the vehicle door; and
   a detection member provided in the grip for detecting an impact,
   the driving of the actuator being prohibited when the detection member detects the impact to the grip.

2. A vehicle door handle device according to claim 1, wherein the operation member and the detection member are connected as one unit within the handle body.

3. A vehicle door handle device according to claim 2, wherein the operation member includes a latch switch and the detection member includes a G sensor.

4. A vehicle door opening and closing system comprising:
   a latch mechanism provided on a vehicle door for switching a latched state and an unlatched state relative to a vehicle body of the vehicle door;
   an actuator for operating the latch mechanism;
   a grip assembled to a panel of the vehicle door;
   an operation member provided on the grip for operating the latch mechanism through the actuator;
   a detection member provided in the grip for detecting an impact to the grip; and
   a control means for controlling a driving of the actuator based on an operation of the operation member and a detected result of the detection member,
   wherein the control means drives the actuator by operation of the operation member and prohibits driving of the actuator when the detection member detects the impact to the grip.

5. A vehicle door opening and closing system according to claim 4, wherein the control means releases the prohibition of the driving of the actuator when the detection member detects the impact to the handle body and a predetermined time has elapsed after detecting the impact.

6. A vehicle door opening and closing system according to claim 5, further comprising an impact detecting circuit having
   the operation member;
   the detection member;
   a central processing unit provided at one end of the circuit; and
   a resistance level varying means for varying a resistance level applied to the central processing unit.

7. A vehicle door opening and closing system according to claim 4, wherein the control means controls the driving of the actuator based on an electric voltage.

8. A vehicle door opening and closing system according to claim 7, the control means drives the actuator by the operation of the operation member and prohibits the driving of the actuator when the detection member detects the impact to the handle body.

9. A vehicle door opening and closing system according to claim 8, further comprising an impact detecting circuit having
   the operation member;
   the detection member;
   a central processing unit provided at one end of the circuit; and
   a resistance level varying means for varying a resistance level applied to the central processing unit.

10. A vehicle door opening and closing system according to claim 9, wherein the control means prohibits the driving of the actuator when the electric voltage is at high level.

11. A vehicle door opening and closing system according to claim 9, wherein the control means prohibits the driving of the actuator when the electric voltage is at low level.

12. A vehicle door opening and closing system according to claim 7, further comprising an impact detecting circuit having
   the operation member;
   the detection member;
   a central processing unit provided at one end of the circuit; and
   a resistance level varying means for varying a resistance level applied to the central processing unit.

13. A vehicle door opening and closing system according to claim 12, wherein the control means prohibits the driving of the actuator when the electric voltage is at low level.

14. A vehicle door handle device according to claim 13, wherein the operation member includes a latch switch and the detection member includes a G sensor.

15. A vehicle door opening and closing system according to claim 12, wherein the control means prohibits the driving of the actuator when the electric voltage is at high level.

16. A vehicle door handle device according to claim 15, wherein the operation member includes a latch switch and the detection member includes a G sensor.

17. A vehicle door opening and closing system according to claim 4, further comprising an impact detecting circuit having
   the operation member;
   the detection member;
   a central processing unit provided at one end of the circuit; and
   a resistance level varying means for varying a resistance level applied to the central processing unit.

18. A vehicle door opening and closing system according to claim 4, further comprising an impact detecting circuit having
   the operation member;
   the detection member;
   a central processing unit provided at one end of the circuit; and
   a resistance level varying means for varying a resistance level applied to the central processing unit.

19. A vehicle door opening system according to claim 4, wherein the grip has a base fixed with a door panel and a cover fixed with the base, and the detection member is a semiconductor strain gauge which detects the impact by detecting a variation of a strain stress applied to the base.

20. A vehicle door opening system according to claim 4, wherein the detection member is a deformative fuse which detects the impact by detecting that a fuse portion is cut by the impact to the handle device or the deformation of the fuse.

* * * * *